United States Patent
Ha et al.

(10) Patent No.: US 10,158,242 B2
(45) Date of Patent: Dec. 18, 2018

(54) WIRELESS CHARGING SYSTEM

(71) Applicant: Samsung Electronics Co., Ltd., Gyeonggi-do (KR)

(72) Inventors: Dohyuk Ha, Gyeonggi-do (KR); Jung Yub Lee, Gyeonggi-do (KR); Junsig Kum, Gyeonggi-do (KR); Youngju Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 15/074,932

(22) Filed: Mar. 18, 2016

(65) Prior Publication Data
US 2016/0276864 A1    Sep. 22, 2016

(30) Foreign Application Priority Data
Mar. 20, 2015    (KR) .......................... 10-2015-0038942

(51) Int. Cl.
*H02J 7/00* (2006.01)
*H02J 7/02* (2016.01)
*H02J 50/20* (2016.01)

(52) U.S. Cl.
CPC ............ *H02J 7/025* (2013.01); *H02J 7/0044* (2013.01); *H02J 50/20* (2016.02)

(58) Field of Classification Search
CPC ......... H01Q 1/243; H01Q 1/245; H02J 7/025; H02J 7/042; H02J 50/20
USPC ........................................................ 320/108
See application file for complete search history.

(56) References Cited

U.S. PATENT DOCUMENTS

| | | |
|---|---|---|
| 8,184,454 B2 | 5/2012 | Mao |
| 8,536,738 B2 | 9/2013 | Bella |
| 2015/0011273 A1* | 1/2015 | Wilmhoff ............... H01Q 1/245 455/575.7 |
| 2015/0171658 A1 | 6/2015 | Manova-Elssibony et al. |

FOREIGN PATENT DOCUMENTS

WO    WO 2013/179284 A2    12/2013

\* cited by examiner

*Primary Examiner* — Paul Dinh

(57) ABSTRACT

Various embodiments of the present disclosure relate to a wireless charging system. The wireless charging system may include: a system body mounted with a power transmission part including a cavity shielded by a conductive material, a power feeding radiator configured to feed power within the cavity to form a resonance mode, and a slot formed at a location with a maximum E-field by the power feeding radiator to form a power transmission route with E-field coupling; and an electronic device including a power reception part mounted on the system body to receive power from the slot through H-field coupling. Various embodiments may be made.

20 Claims, 12 Drawing Sheets

WIRELESS CHARGING SYSTEM

CROSS-REFERENCE TO RELATED APPLICATION AND CLAIM OF PRIORITY

The present application is related to and claims benefit under 35 U.S.C. § 119(a) to Korean Application Serial No. 10-2015-0038942, which was filed in the Korean Intellectual Property Office on Mar. 20, 2015, the entire content of which is hereby incorporated by reference.

TECHNICAL FIELD

Various embodiments of the present disclosure relate to a wireless charging system of an electronic device.

BACKGROUND

Research has been actively performed on a wireless power transmission technology that is capable of conveniently supplying power to, or charging, various electronic devices wirelessly. Such a wireless power transmission technology is applied to the wireless charging of a smart phone or an electric car.

With a conventional wireless charging technology of an electronic device, it was possible to wirelessly charge an electronic device by using magnetic induction or magnetic resonance.

A wireless charging method using the magnetic induction refers to a method of supplying power within a short distance using an internal coil of a charger by mounting a coil wound multiple times on a battery cover of an electronic device.

A wireless charging method using the resonance refers to a method of supplying power to an electronic device at a long distance by using the resonance phenomenon of a magnetic field.

A wireless charging method using microwaves refers to a method of transmitting power wirelessly by radiating microwave signals into the air by using an antenna.

However, the magnetic induction charging method of an electronic device is a wireless charging method, in which charging is only enabled within a short distance of several centimeters. The magnetic induction charging method has caused various problems of, for example, mountability since the coil is mounted on the battery cover.

The wireless charging method using the magnetic resonance is advantageous in that charging is automatically performed around a charger, but has a problem in terms of harmfulness to a human body.

SUMMARY

To address the above-discussed deficiencies, it is a primary object is to provide a wireless charging system including a power transmission part that uses a cavity and a power reception part that is mounted on an electronic device that has an external metal frame.

Various embodiments of the present disclosure are to provide a wireless charging system in which power is fed within a cavity through E-field coupling or H-field coupling, and a power reception part of an electronic device receives the power through H-field coupling.

Various embodiments of the present disclosure are to provide a wireless charging system in which power is fed through E-field coupling or H-field coupling within a cavity, and a power reception part of an electronic device receives power through E-field coupling.

In addition, various embodiments of the present disclosure are to provide a wireless charging system capable of multiple charging.

Various embodiments of the present disclosure provide a wireless charging system that may include: a system body mounted with a power transmission part including a cavity shielded by a conductive material, a power feeding radiator that feeds power within the cavity to form a resonance mode, and a slot formed at a location with a maximum E-field by the power feeding radiator to form a power transmission route through E-field coupling; and an electronic device including a power reception part mounted on the system body to receive power from the slot through H-field coupling.

In addition, various embodiments of the present disclosure provide a wireless charging system of an electronic device. The wireless charging system may include: a charging system mounted with a power transmission part including a cavity shielded by a conductive material, a radiator disposed in the cavity, a slot for power feeding, and an aperture for power reception, the slot and aperture being formed on a side wall of the conductive material at two locations with maximum E-field, and being H-field coupled by power feeding of the radiator to form a power transmission route; and an electronic device including a power reception part mounted on the charging system to receive power from the aperture through H-field coupling.

In addition, various embodiments of the present disclosure provide a wireless charging system that may include: a system body mounted with a power transmission part including a cavity shielded by a conductive material, a power feeding radiator that feeds power within the cavity, and a slot formed at a location with a maximum E-field by the power feeding radiator to form a power transmission route through E-field coupling; and an electronic device including a power reception part mounted on the system body to receive power from the slot with E-field coupling.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
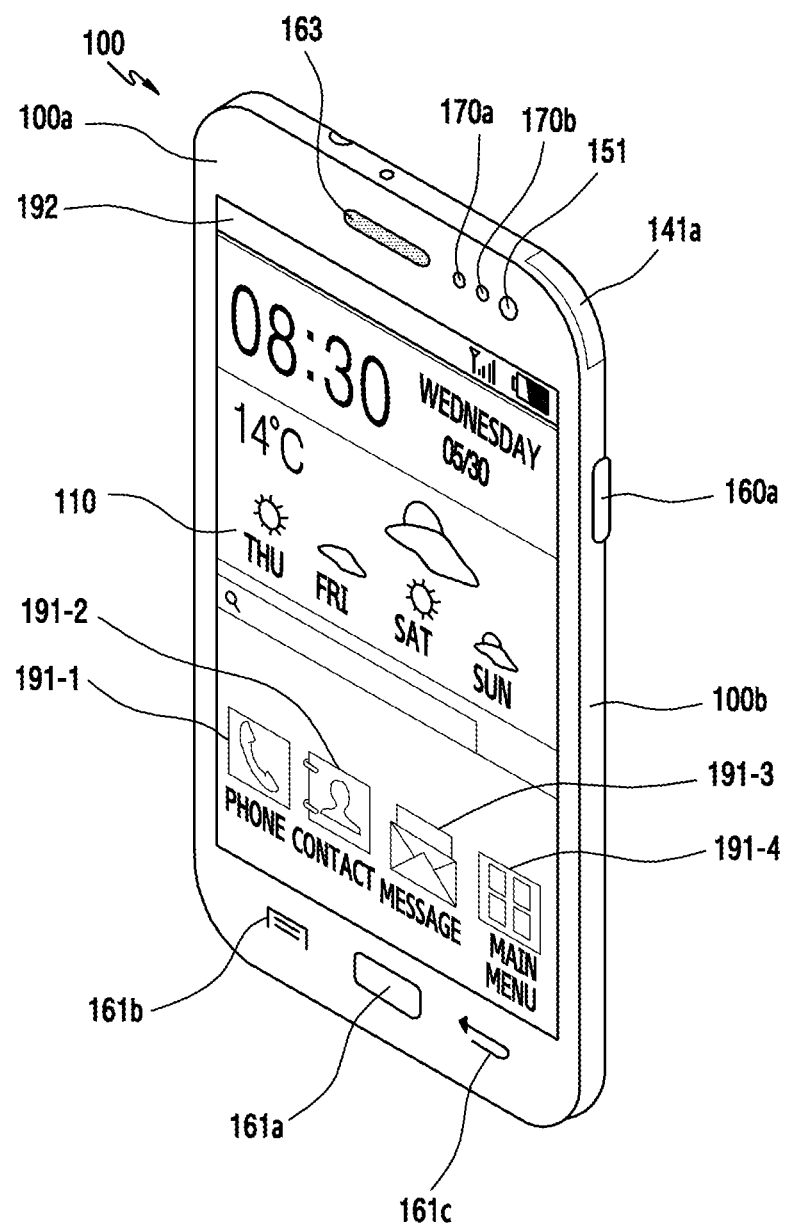
FIG. 1 illustrates the front face of an electronic device according to various embodiments.
Figure 2:
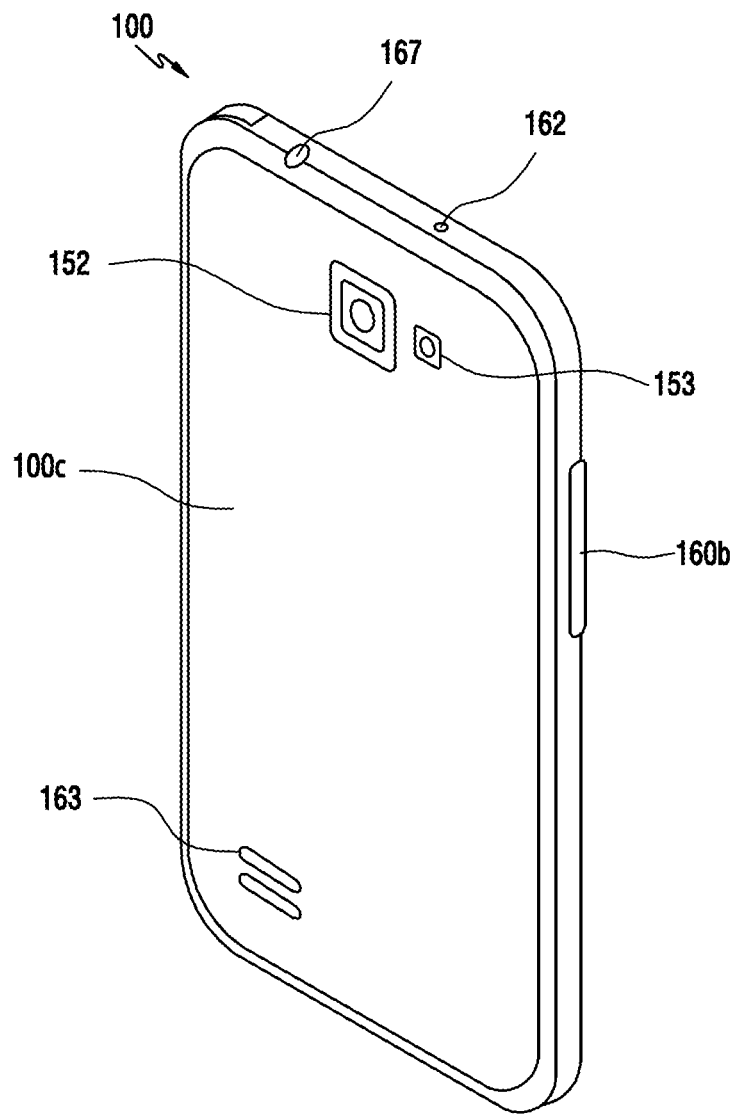
FIG. 2 illustrates the rear face of the electronic device according to various embodiments.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. FIG. 1 is a perspective view illustrating the front face of an electronic device according to an embodiment of the present disclosure. FIG. 2 is a perspective view illustrating the rear face of the electronic device according to the embodiment of the present disclosure.

Referring to FIGS. 1 and 2, the electronic device 100 may include an external appearance that may be formed by a front face 100a, a rear face 100c, and one or more side rims 100b. In the electronic device 100, by using a structure, such as a case, a touch screen 110 may be disposed on the front face 100a, a rear cover or a battery cover may be formed on the rear face 100c, and one or more keys 160a and 160b, a USB connector, an earphone connecting jack 167, or the like may be disposed on the side rims 100b. In the exterior appearance structure of the electronic device 100, the case may include an injection-molded material, a metallic material, or a combination thereof. For example, the case, which forms the external appearance of the electronic device 100, may be entirely formed of an injection-molded material. In addition, the case, which forms the external appearance of the electronic device 100, may be entirely formed of a metallic material. In addition, in the electronic device 100, a portion of the case, which forms the external appearance, may be formed of an injection-molded material, and the remaining portion may be formed of a metallic material.

For example, when at least a portion of the side rims 100b is formed of a metallic material, the electronic device 100 may use the portion as an antenna. When at least a portion of the side rims 100b is used as an antenna, among the side rims 100b, a metal rim that is positioned on the upper end, a metal rim that is positioned on the lower end, or a metal rim that is positioned on a side end may be used as a radiator of the antenna. In addition, when at least a portion of the side rims 100b is formed of a metallic material, the electronic device 100 may use the portion as a structure that allows the earphone connecting jack 167 or the USB connector 165 to be rigidly mounted thereon, and the portion may make the exterior appearance luxurious. An antenna, according to various embodiments, may use a portion of the exterior appearance structure of the electronic device. In particular, the antenna may use a metal rim as an antenna radiator.

Hereinafter, functions, which are displayed on a touch screen of the electronic device, will be described.

According to various embodiments, a touch screen 110 may be disposed on the center of the front face 100a of the electronic device 100. The touch screen 110 is formed in a large size to occupy a great portion of the front face 100a of the electronic device 100. FIG. 1 illustrates an example in which a main home screen is displayed on the touch screen 110. The main home screen refers to the first screen that is displayed on the touch screen 110 when the power of the electronic device 100 is turned on. In addition, when the electronic device 100 includes several pages of different home screens, the main home screen may be the first home screen among the several pages of different home screens. The home screen may display shortcut icons 191-1, 191-2, and 191-3 to execute frequently used applications, a main menu switching key 191-4, time, weather, or the like. The main menu switching key 191-4 may cause the menu screen to be displayed on the touch screen 110. In addition, in the upper end of the touch screen 110, status bars 192 may be formed to indicate the statuses of the electronic device 100, such as a battery charge status, a received signal strength, and the current time. Below the touch screen 110, a home button 161a, a menu button 161b, and a back button 161c may be formed.

According to various embodiments, the home button 161a may cause the main home screen to be displayed on the touch screen 110. For example, when the home button 161a is touched in the state where a home screen, which is different from the main home screen, or the menu screen is displayed on the touch screen 110, the main home screen may be displayed on the touch screen 110. In addition, when the home button 161a is touched while applications are executed on the touch screen 110, the main home screen illustrated in FIG. 1 may be displayed on the touch screen 110. In addition, the home button 161a may be used in order to cause the touch screen 110 to display the most recently used application or a task manager.

The menu button 161b provides a connection menu that may be used on the touch screen 110. The connection menu may include a widget addition menu, a background screen change menu, a retrieve menu, an edition menu, an environment setting menu, or the like. According to various embodiments, the back button 161c may cause the screen, which was executed just prior to the currently executed screen, to be displayed, or may cause the most recently used application to be terminated.

According to various embodiments, a first camera 151, an illuminance sensor 170a, and a proximity sensor 170b may be arranged in an edge of the front face 100a of the electronic device 100. A second camera 152, a flash 153, and a speaker 163 may be arranged on the rear face 100c of the electronic device 100.

According to various embodiments, for example, a power/reset button 160a, a volume button 160b, a terrestrial DMB antenna 141a for broadcasting reception, one or more mics 162, or the like may be arranged on the side faces 100b of the electronic device 100. The DMB antenna 141a may be fixed to the electronic device 100, or may be formed to be attached to/removable from the electronic device 100.

According to various embodiments, a connector (not shown) may be formed on the lower end side face of the electronic device 100. The connector is formed with a plurality of electrodes, and may be connected to an external device via a wire. An earphone connecting jack 167 may be arranged on the upper end side face of the electronic device 100. An earphone may be inserted into the earphone connecting jack 167. The earphone connecting jack 167 may be arranged on the lower end side face of the electronic device 100.

Hereinafter, descriptions will be made on a configuration of a wireless charging system that is capable of wirelessly charging an electronic device, according to various embodiments of the present disclosure, with reference to the accompanying drawings.

Figure 3:
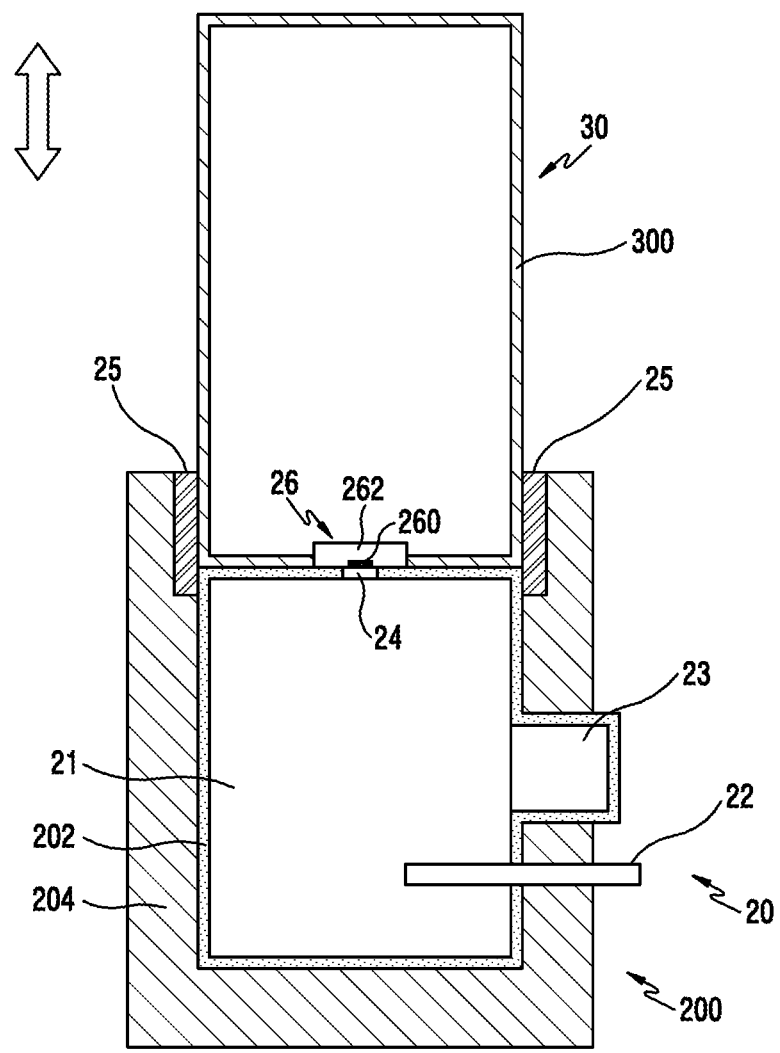
FIG. 3 illustrates a configuration of a wireless charging system according to various embodiments of the present disclosure.
Figure 4:
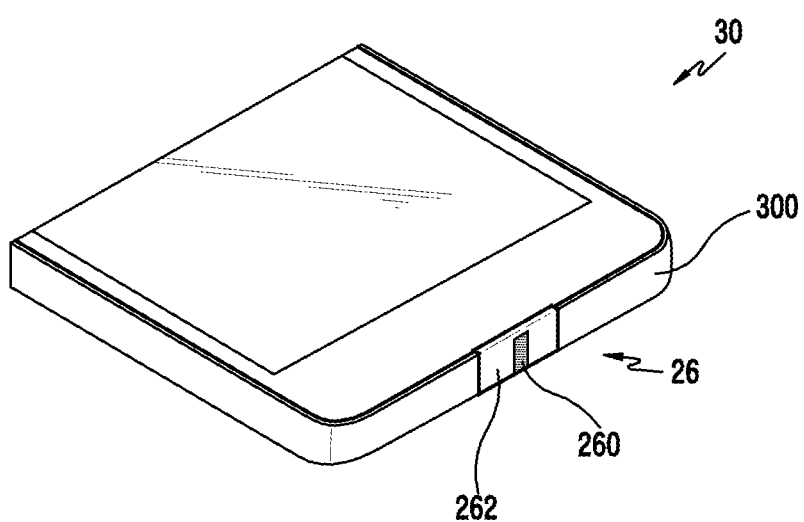
FIG. 4 illustrates a state in which a power reception part is mounted on an electronic device according to various embodiments of the present disclosure.
Figure 5:
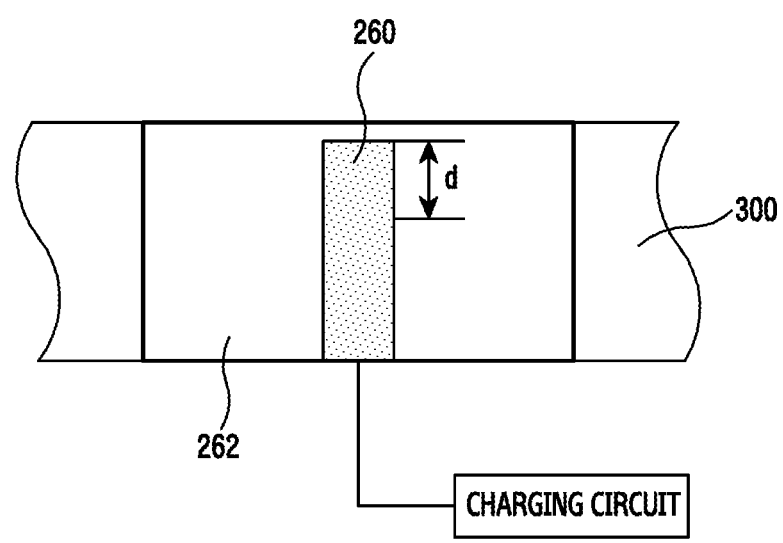
FIG. 5 illustrates, in an enlarged scale, the state in which the power reception part is mounted on the electronic device according to various embodiments of the present disclosure.

With reference to FIGS. 3 to 5, descriptions will be made on a structure of a wireless charging system that feeds power to a cavity through E-field coupling and allows an electronic device to receive the power through H-field coupling, according to various embodiments of the present disclosure.

FIG. 3 is view illustrating a configuration of a wireless charging system according to various embodiments of the present disclosure.

Referring to FIG. 3, a wireless charging system 20 (hereinafter, referred to as a "system"), according to various embodiments of the present disclosure, refers to a unit that is capable of charging an electronic device 30 in a wireless manner when the electronic device 30 is mounted thereon. In particular, the wireless charging system 20 may be a system configured to wirelessly charge an electronic device 30 in which at least a portion of the exterior appearance structure is formed of a conductive material (e.g., a metal). The exterior appearance structure of the electronic device 30 (see FIGS. 1 and 2) may include a rear face and a plurality of side faces, except a front face on which the display is disposed. The rear face and/or side faces may be at least partially or entirely formed of a conductive material (e.g., a metallic material). When a side face, which forms the exterior appearance of the electronic device 30, according to various embodiments, is formed of a metallic material, the side face of the metallic material may be configured in a segmented type or a non-segmented type.

The system 20, according to various embodiments, may include a part that transmits power to the electronic device 30 (hereinafter, referred to as a "transmission part"), a part that is provided to the electronic device 30 to receive the transmitted power (hereinafter, referred to as a "reception part"), and a connection part 25 that interconnects both parts.

When the electronic device 30, which includes the reception part 26, is mounted on the system 20, the mounted reception part 26 may be a system that receives power by coupling with the transmission part. In addition, the system 20 may be configured such that the electronic device 30 may be safely mounted on the transmission part and the mounted state may be fixed by the connection part 25. On the contrary, the fixed state may be released so that the mounted electronic device 30 may be removed from the transmission part.

According to various embodiments, the transmission part is provided to a system body, and is formed on the system body in a box shape that includes a space in which the electronic device is capable of being mounted to be charged. The reception part 26 is mounted on the lower end of the electronic device 30, and the connection part may be mounted to be interlocked with the electronic device 30 that is mounted on the top portion of the system body.

According to various embodiments, the transmission part is a device that is mounted on the box-shaped system body in which an inner skin (or an inner material portion) and an outer skin (or an outer material portion) are formed of different materials. The transmission part may include a cavity 21 that is shielded in order to form an internal resonance space, a power feeding radiator 22 that feeds power to the cavity 21 when a current is applied thereto, and a slot 24 that is formed at a location where the maximum power is formed by E-field coupling according to an operation of the power feeding radiator 22 in the cavity 21. The transmission part may include a cavity 21 that is shielded by a conductive material (e.g., a metallic material 202). The cavity 21 refers to a space where an E-field is coupled by the operation of the power feeding radiator 22 to form a resonance mode. That is, the cavity 21 may be formed in a structure that is closed by a metallic material 202 that forms one or more inner walls. The inner walls of the conductive material 202 may include a plurality of side walls, a ceiling wall, and a bottom. The outer material portion 204 may be configured to enclose the inner material portion, i.e. the conductive material 202, but may be formed of a material that is different from that of the inner material portion. Otherwise, the cavity 21 is not necessarily limited to a cube shape of a box shape, and may be formed in a cylindrical shape, a polygonal pillar shape, or the like.

According to various embodiments, the outer material portion 204 may be constituted with a non-metal layer. As already described, the system body, which is provided with the transmission part, includes a box shape, and may be configured in a shape that is capable of providing a resonance space for wirelessly supplying power to the electronic device 30, and is capable of fixing a guide for mounting the electronic device 30 and the mounted electronic device 30.

According to various embodiments, one or more power feeding radiators 22 may be disposed on the inner walls of the cavity 21, and at least a portion of the power feeding radiators 22 may be disposed within the cavity 21, in particular on the inner walls. When a current is applied to the power feeding radiator 22, the power feeding radiator 22 may be fed with power to form the inside of the cavity 21 in a resonance mode of a specific frequency band, and may form the maximum power in the slot 24 through an E-field coupling operation. The power feeding radiator 22 may include a monopole antenna or a dipole antenna.

According to various embodiments, the slot 24 may be formed in the ceiling wall among the inner walls of the cavity 21 to be electrically and physically connected to the reception part 26 of the mounted electronic device 30. That is, when the electronic device 30 is mounted on the system body 200, the slot 24 and the reception part 26 of the electronic device may be arranged to overlap with each other in the vertical direction.

According to various embodiments, there may be provided a pair of connection parts 25, which may be mounted on the upper end of the system body 200 to allow the mounted electronic device 30 to be fixed or to be removed. In addition, the connection parts 25 may serve to guide and arrange the electronic device 30 when the electronic device 30 is mounted. In particular, when the electronic device 30 is mounted in an erected state, the connection parts 25 may provide a holding force that is capable of maintaining the overlapping state between the reception part 26 and the slot 24. In addition, although not illustrated in the drawings, the connection parts 25 may be provided with a restoration member, such as an elastic body, to hold the mounted electronic device or to allow the electronic device to be removed. In addition, the connection parts 25 may form a common ground structure when the inner walls of the cavity 21 and the external metal frame 300 of the electronic device 30 are in contact with each other.

FIG. 4 is a front view illustrating a state in which the power reception part is mounted on an electronic device, according to various embodiments of the present disclosure. FIG. 5 is a front view illustrating, in an enlarged scale, the state in which the power reception part is mounted on an electronic device, according to various embodiments of the present disclosure.

Referring to FIGS. 4 and 5, according to various embodiments, an electronic device 30 may include a power reception part 26 at a predetermined position. According to various embodiments, the power reception part 26 may be a device that is connected to the slot 24 in order to receive power, and may include a dielectric board 262 and a transmission line 260 that is provided on the dielectric board 262. The transmission line 260 formed on the dielectric board 262 should be disposed to overlap with the slot 24. In particular, the extension direction of the transmission line 260 may be disposed to be perpendicular to the longitudinal direction of the slot 24. The power reception part may be disposed on at least a portion of the external metal frame of the electronic device. In particular, the power reception part may be mounted on the external metal frame that exists on the upper rim, the lower rim, or a side rim.

According to various embodiments, one end of the transmission line 260 may be connected to a charging circuit, and the length d between the other end and the slot 24 may be determined to be matched with the impedance of the charging circuit.

Referring to FIG. 3 again, the system, according to various embodiments, may feed power to the inside of the cavity 21 by using a waveguide 23. According to various embodiments, the waveguide 23 may be installed on an inner wall of the cavity 21, and may feed power to the inside of the cavity 21 through an aperture through E-field coupling. In other words, power may be fed to the inside of the cavity by using the waveguide 23 in place of the power feeding radiator illustrated in FIG. 3. In the case of power feeding to the cavity 21 through the waveguide 23 (or waveguide tube), the size and input position of the waveguide 23 may be designed such that a cut-off frequency is lower than a charging frequency, and the direction of the E-field at the charging frequency is perpendicular to a contact face between the waveguide 23 and the cavity 21.

Figure 6:
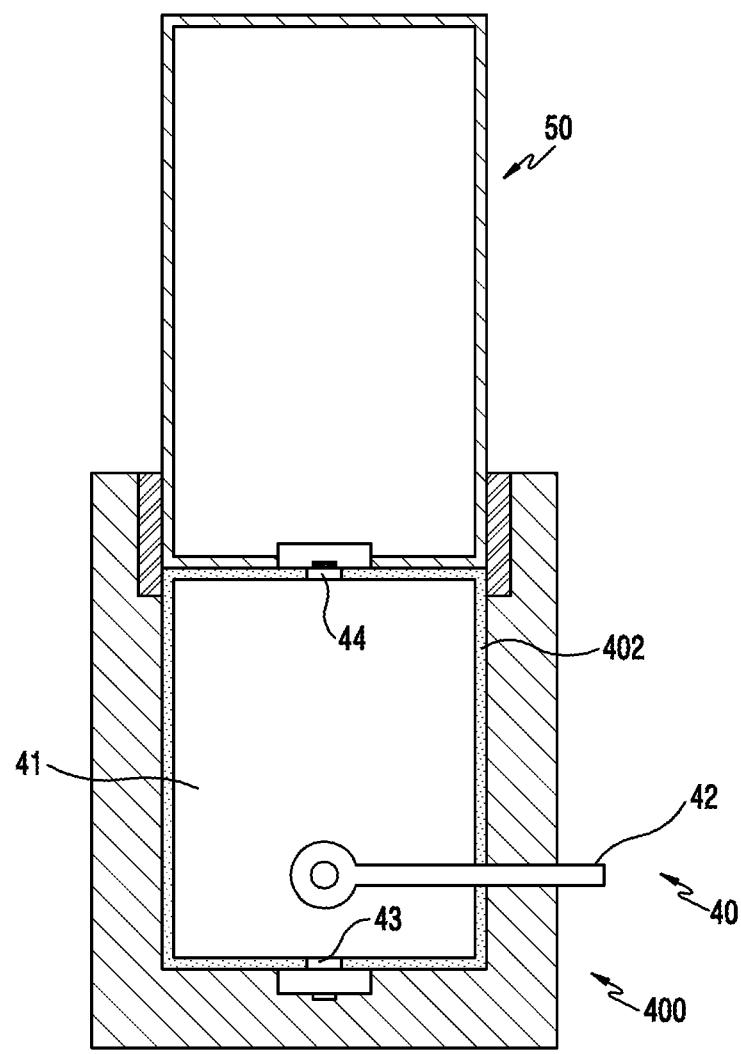
FIG. 6 illustrates a configuration of another wireless charging system according to various embodiments of the present disclosure.

FIG. 6 is view illustrating a configuration of another wireless charging system according to various embodiments of the present disclosure.

With reference to FIG. 6, descriptions will be made on a structure of a wireless charging system in which power is fed to the inside of a cavity through H-field coupling and an electronic device receives the power through H-field coupling, according to various embodiments of the present disclosure.

In describing the wireless charging system illustrated in FIG. 6, descriptions on the same structures as those of the wireless charging system illustrated in FIG. 3 will be omitted, and only the different configurations will be described. Since the configurations of the connection part and the power reception part are the same as those of the wireless charging system of FIG. 3, descriptions thereof will be omitted.

Referring to FIG. 6, a system, according to various embodiments, may include a radiator and a slot in order to feed power to the inside of the cavity through H-field coupling. The system, according to various embodiments, may include a first slot for power feeding and a second slot for power transmission, which may be formed in a shielded cavity at two locations of inner walls that include the maximum H-field in a resonance mode where H-fields are concentrated. The first slot may be disposed in the bottom of an internal metal layer, and the second slot may be disposed in the ceiling wall of the internal metal layer.

When a current is applied to the radiator, the cavity may be fed with power through H-field coupling, and, through the second slot, the reception part may receive the power through H-field coupling.

A dielectric board and a transmission line formed on the dielectric board may be disposed within the first slot.

Figure 7:
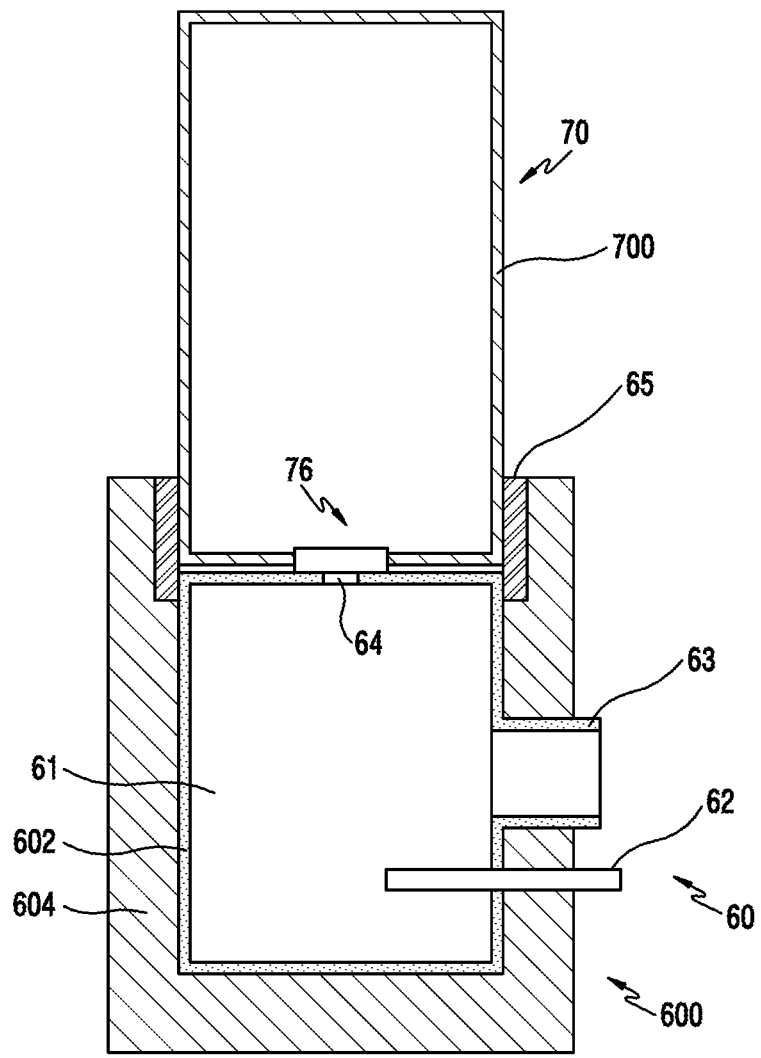
FIG. 7 illustrates a configuration of another wireless charging system according to various embodiments of the present disclosure.
Figure 8:
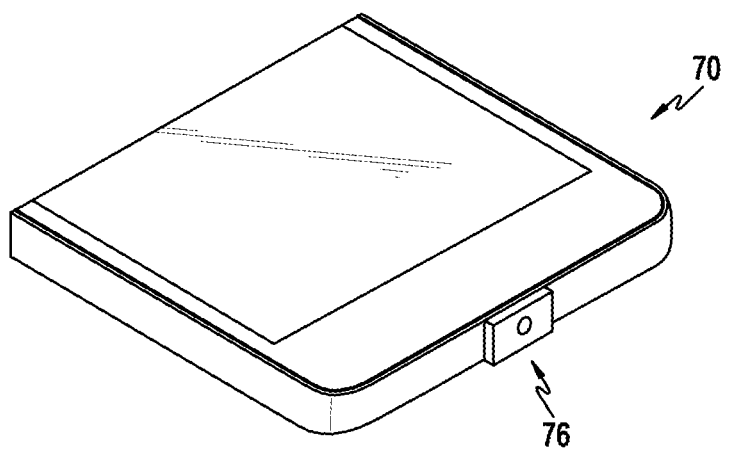
FIG. 8 illustrates a state in which a power reception part is mounted on an electronic device according to various embodiments of the present disclosure.
Figure 9:
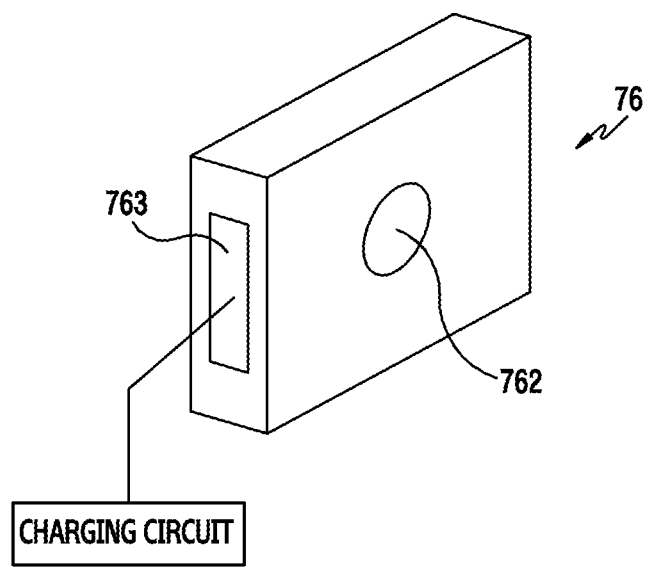
FIG. 9 illustrates the power reception part in an enlarged scale, according to various embodiments of the present disclosure.

With reference to FIGS. 7 to 9, descriptions will be made on a structure of a wireless charging system in which power is fed to the inside of a cavity through E-field coupling and an electronic device receives the power through E-field coupling, according to various embodiments of the present disclosure.

FIG. 7 is view illustrating a configuration of another wireless charging system according to various embodiments of the present disclosure.

Referring to FIG. 7, a wireless charging system 60 (hereinafter, referred to as a "system"), according to various embodiments of the present disclosure, refers to a unit that is capable of charging an electronic device 70 in a wireless manner when the electronic device 70 is mounted thereon. In particular, the wireless charging system 60 may be a system configured to wirelessly charge the electronic device 70 in which at least a portion of the exterior appearance structure is formed of a conductive material (e.g., a metal). According to various embodiments, the exterior appearance structure of the electronic device 70 (see FIGS. 1 and 2) may include a rear face and a plurality of side faces, except a front face, on which the display is disposed. The rear face and/or side faces may be at least partially or entirely formed of a conductive material (e.g., a metallic material). In addition, when a side face, which forms the exterior appearance of the electronic device 70, according to various embodiments, is formed of a metallic material, the side face of the metallic material may be configured in a segmented type or a non-segmented type.

The system 60, according to various embodiments, may include three parts as follows: a wireless power transmission part that uses a cavity 61, a wireless power reception part that is mounted on the electronic device 70, and a portion that interconnects the cavity 61 and the electronic device 70. In other words, the system may include a part that transmits power to the electronic device 70 (hereinafter, referred to as a "transmission part"), a part 76 that is provided to the electronic device 70 to receive the transmitted power (hereinafter, referred to as a "reception part"), and a connection part 65 that connects both parts to each other. The transmission part and the connection part may be mounted on the system body 600, and the reception part 76 may be mounted on a portion of the electronic device 70.

When the electronic device 70, which includes the reception part 76, is mounted on the system 60, the mounted reception part 76 may be a system that receives power by coupling with the transmission part. In addition, the system 60 may be configured such that the electronic device 70 may be safely mounted on the transmission part and the mounted state may be fixed by the connection part 65. On the contrary, the fixed state may be released so that the mounted electronic device 70 may be removed from the transmission part.

According to various embodiments, the transmission part is provided to a system body 600, and is formed on the system body 600 in a box shape that includes a space in which the electronic device is capable of being mounted to be charged. The reception part 76 is mounted on at least a portion of an external metal frame 700 of the electronic device 70, and the connection part 65 may be mounted to be interlocked with the electronic device 70 that is mounted on the top portion of the system body 600.

According to various embodiments, the transmission part is a device that is mounted on the box-shaped system body 600 in which an inner material portion 602 and an outer material portion 604 are formed of different materials. The transmission part may include a cavity 61 that is shielded in order to form an internal resonance space, a power feeding radiator 62 that performs power feeding by applying a current to the cavity 61, and a slot 64 that is formed at a location where the maximum power is formed by E-field coupling according to an operation of the power feeding radiator 62 in the cavity 61. The transmission part may include a cavity 61 that is shielded by a conductive material (e.g., a metallic material 602). The cavity 61 refers to a space where an E-field is coupled by the operation of the power feeding radiator 62 to form a resonance mode. That is, the cavity 61 may be formed in a structure that is closed by an inner material portion 602 that forms one or more inner walls. The inner walls of the inner material portion 602 may include a plurality of side walls, a ceiling wall, and a bottom. The outer material portion 604 may be configured to enclose the inner material portion 602, i.e. the conductive material. Otherwise, the cavity 61 is not necessarily limited to a cube shape of a box-shaped, and may be formed in a cylindrical shape, a polygonal pillar shape, or the like.

The outer material portion 602 may be constituted with a non-metal layer. As already described, the system body 600, which is provided with the transmission part, includes a box shape, and may be configured in a shape that is capable of providing a resonance space for wirelessly supplying power to the electronic device 70, and is capable of fixing a guide for mounting the electronic device 70 and the mounted electronic device 70.

One or more power feeding radiators 62 may be disposed on the inner wall of the cavity 61, and at least a portion of the power feeding radiators 62 may be disposed within the cavity 61, in particular on the inner wall. When a current is applied to the power feeding radiator 62, the power feeding radiator 62 may be fed with power to form the inside of the cavity 61 in a resonance mode of a specific frequency band, and may form the maximum power in the slot 64 with an E-field coupling operation. The power feeding radiator 62 may include a monopole antenna or a dipole antenna.

According to various embodiments, the slot 64 may be formed in the ceiling wall among the inner walls of the cavity 61 to be electrically and physically connected to the reception part 76 of the mounted electronic device. That is, when the electronic device 70 is mounted on the system body 600, the slot 64 and the reception part 76 of the electronic device may be arranged to overlap with each other in the vertical direction.

According to various embodiments, there may be provided a pair of connection parts 65 and the connection parts 65 may be mounted on the upper end of the system body 600 to allow the mounted electronic device 70 to be fixed or to be removed. In addition, the connection parts 65 may serve to guide and arrange the electronic device 70 when the electronic device 70 is mounted. In particular, when the electronic device 70 is mounted in an erected state, the connection parts 65 may provide a holding force that is capable of maintaining the overlapping state between the reception part 76 and the slot 64. In addition, although not illustrated in the drawings, the connection parts may be provided with a restoration member, such as an elastic body, to hold the mounted electronic device or to allow the electronic device to be removed. In addition, the connection part 65 may form a common ground structure when the inner walls of the cavity 61 and the external metal frame 700 of the electronic device 70 are in contact with each other.

FIG. 8 is a perspective view illustrating a state in which the power reception part is mounted on an electronic device, according to various embodiments of the present disclosure. FIG. 9 is a front view illustrating the power reception part, according to various embodiments of the present disclosure, in an enlarged scale.

Referring to FIGS. 8 and 9, according to various embodiments, an electronic device may include a power reception part 76 at a predetermined position. According to various embodiments, the power reception part 76 may be a device that is disposed to overlap with the slot in order to receive power, and may include a waveguide portion 762 and air or a dielectric material that is filled in the waveguide portion 762. The waveguide portion 762, which is filled with the air or dielectric material, should be disposed to overlap with the slot. The power reception part 76 may be disposed on at least a portion of the external metal frame 700 (see FIG. 7) of the electronic device, and may be mounted on the external metal frame that is present on an external metal frame that exists on the upper rim, the lower rim, or a side rim. One side of the waveguide portion 762 may be opened, and the opened portion 763 may be electrically connected to a charging circuit.

According to various embodiments, the waveguide portion 762 is a waveguide that receives power through E-field coupling and may be a portion at which E-fields are concentrated. The aperture of the waveguide, which exists in the central region, may be disposed at a place where it is in contact with the slot. In addition, the waveguide portion 762 may be configured with a size that is equal to or smaller than an aperture that is formed in the cavity.

In the case of the waveguide 762 within the power reception part 76, the size and input position of the waveguide 762 may be designed such that a cut-off frequency is lower than a charging frequency, the direction of a coupled E-field is perpendicular to the aperture for power transmission between the cavity and the waveguide within the electronic device at the charging frequency, and the direction of the E-field and the input of the waveguide 762 are horizontal.

Referring to FIG. 7 again, the system, according to various embodiments, may feed power to the inside of the cavity 61 by using a waveguide 63. According to various embodiments, the waveguide 63 may be installed on an inner wall of the cavity 61, and may feed power to the inside of the cavity 61 through an aperture through E-field coupling. In other words, power may be fed to the inside of the cavity by using the waveguide 63 in place of the power feeding radiator 62. Power may be fed to the inside of the cavity by using the waveguide 63 in place of the power feeding radiator. In the case of power feeding to the cavity 61 through the waveguide 63 (or waveguide tube), the size and input position of the waveguide 63 may be designed such that the cut-off frequency is lower than the charging frequency, and the direction of the E-field at the charging frequency is perpendicular to a contact face between the waveguide 63 and the cavity 61.

Figure 10:
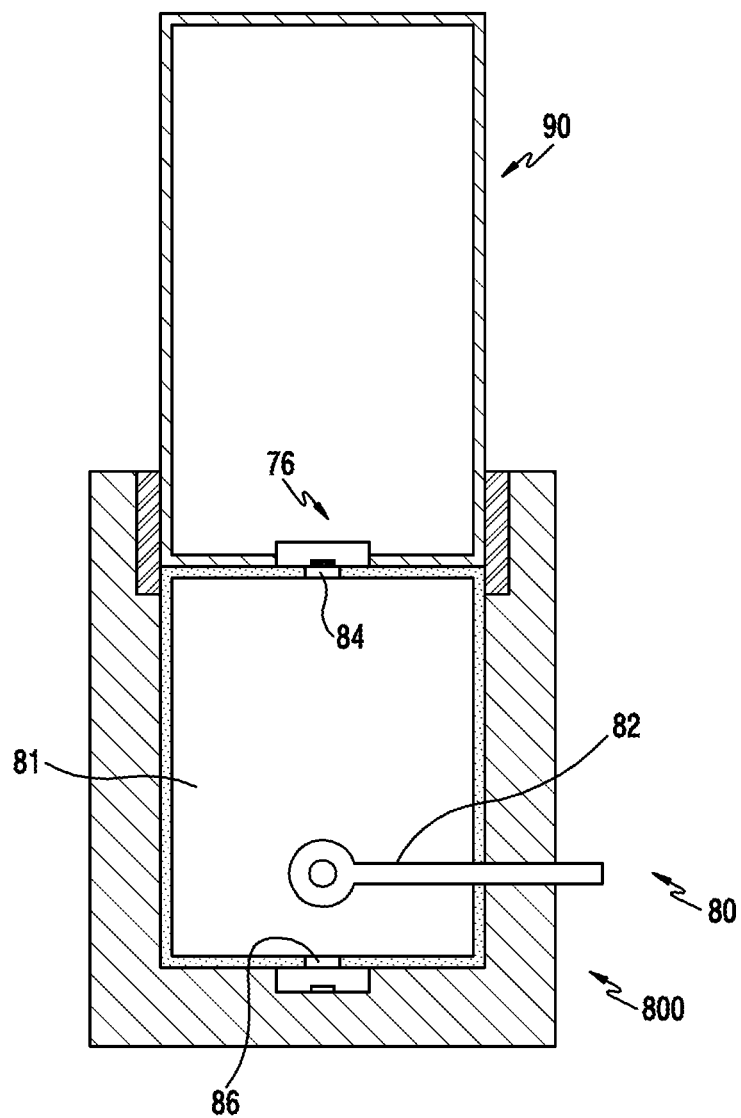
FIG. 10 illustrates a configuration of another wireless charging system according to various embodiments of the present disclosure.

FIG. 10 is view illustrating a configuration of another wireless charging system according to various embodiments of the present disclosure.

With reference to FIG. 10, descriptions will be made on a structure of a wireless charging system in which power is fed to the inside of a cavity through H-field coupling and an electronic device receives the power through E-field coupling, according to various embodiments of the present disclosure.

In describing the wireless charging system illustrated in FIG. 10, descriptions on the same configurations as those of the wireless charging system illustrated in FIG. 7 will be omitted, and only the different configurations will be described. Since the configurations of the connection part and the power reception part are the same as those of the wireless charging system of FIG. 7, descriptions thereof will be omitted.

Referring to FIG. 10, a system, according to various embodiments, may include a radiator 82, a slot 86, and an aperture 84 in order to feed power to the inside of the cavity 81 through H-field coupling. The system may include the slot 86 for power feeding and the aperture 84 for power transmission, which are formed in the shield cavity 81 at two locations of an inner wall where the H-field is maximum. The slot 86 may be disposed in the bottom of the inner material portion, and the aperture 84 may be disposed in the ceiling wall of the inner material portion.

When a current is applied to the power feeding radiator 82, the cavity 81 is fed with power through H-field coupling, and the reception part 76 may receive the power through the aperture 84 through E-field coupling.

Figure 11:
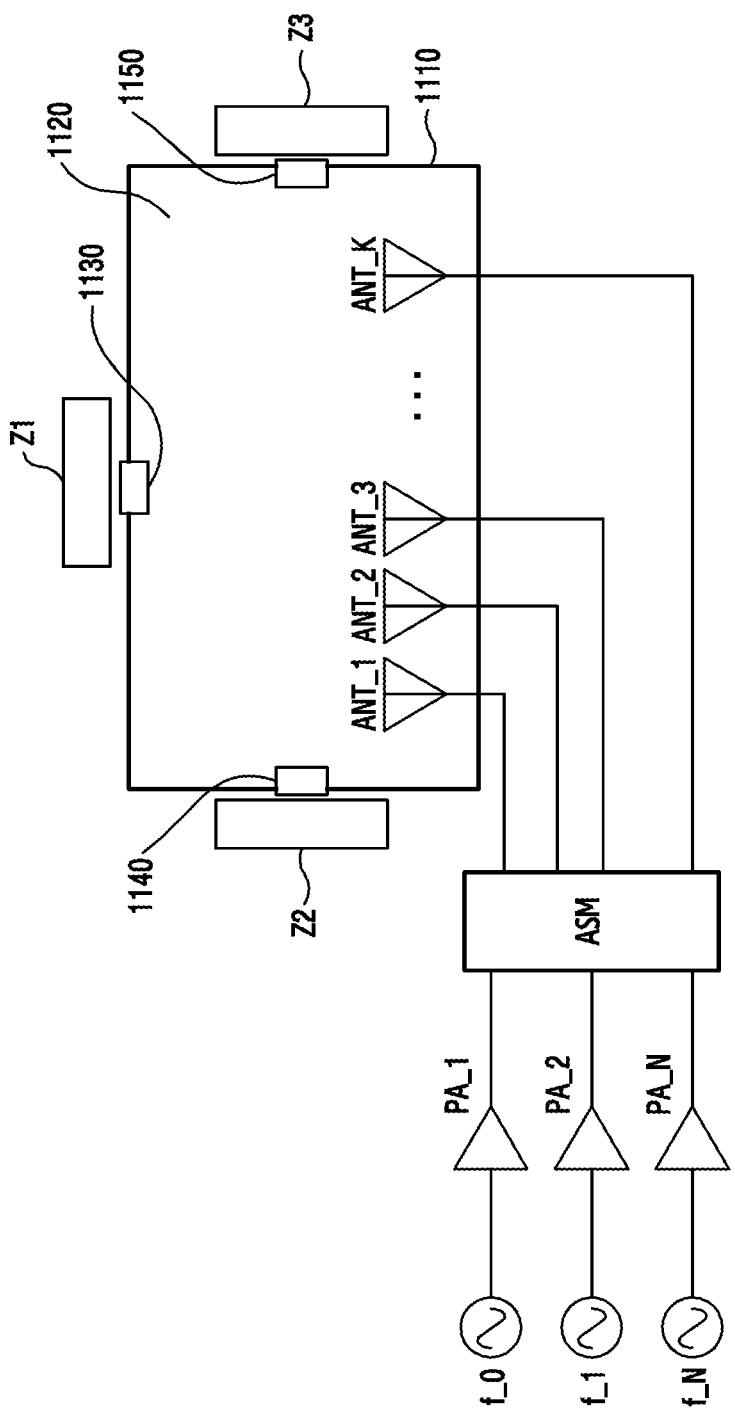
FIG. 11 illustrates a configuration of another wireless charging system according to various embodiments of the present disclosure.

FIG. 11 is view illustrating a configuration of another wireless charging system according to various embodiments of the present disclosure.

Referring to FIG. 11, a wireless charging system, according to various embodiments of the present disclosure, is a system that enables a multiple charging mode, and may use a predetermined number of frequencies f (e.g., N frequencies f in which N is 2 or more) and all or some of K charging antennas ANT to form, through a plurality of slots 1130, 1140, and 1150, which are formed in the side wall 1110 of the cavity 1120, charging zones Z1, Z2, and Z3 for the slots at the outside of the slots, respectively.

A charging system, according to various embodiments, may include a plurality of power amplifiers PA, a plurality of charging antennas ANT, and an antenna switch module ASM that is capable of selecting one or more charging antennas among the plurality of charging antennas. In the system, the power output modules may support different frequencies, respectively, or may support the same frequency.

The process of selecting n frequencies to be used and k antennas to be used among the plurality of possible frequencies f and charging antennas during the charging of the charging system, may be determined in consideration of the kind of an electronic device to be charged, and the maximizing the charging efficiency at a position outside the cavity 1120 in which the electronic device to be charged is placed. In addition, the charging frequency may be an ISM band or an unlicensed band.

Figure 12:
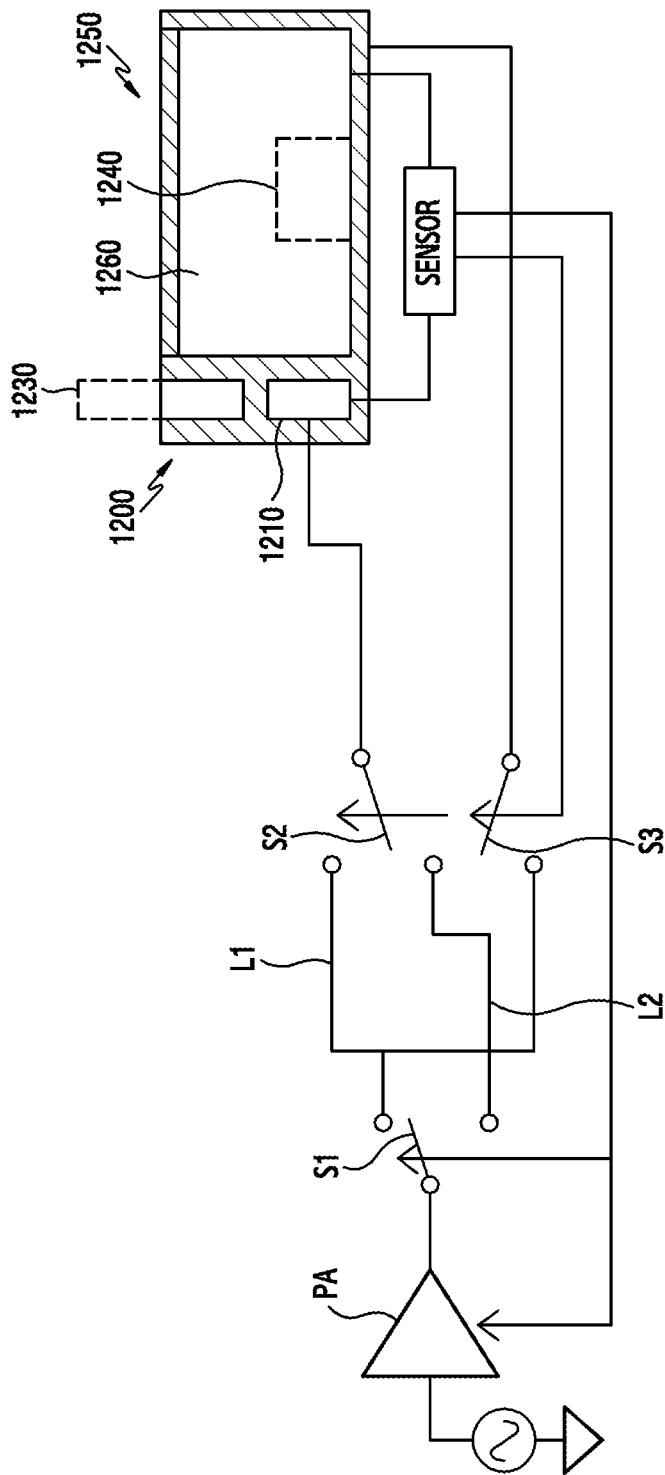
FIG. 12 illustrates a configuration of another wireless charging system according to various embodiments of the present disclosure.

FIG. 12 is view illustrating a configuration of another wireless charging system according to various embodiments of the present disclosure.

Referring to FIG. 12, a wireless charging system, according to various embodiments of the present disclosure, may charge, by using a plurality of cavities 1210 and 1260 (in FIG. 12, two (2)), electronic devices 1230 and 1240, which are mounted in the cavities 1210 and 1260, respectively. As illustrated in FIG. 12, first and second chargers 1200 and 1250 may be provided using two cavities 1210 and 1260. The first and second chargers 1200 and 1250 may charge electronic devices to be charged 1230 and 1240, respectively. Both the electronic devices 1230 and 1240 may be smart phones, or one of the electronic devices 1230 and 1240 may be a smart phone and the other may be a wearable device.

The first wireless charger 1200, on which the electronic device 1230 may be mounted, may be constituted with any one of wireless charging systems, according to various embodiments, which have been described with reference to FIGS. 3 to 10. The second charger 1250 may be the same as the first charger, or may be constituted with a different kind of wireless charging system.

In addition, the wireless charging system, according to various embodiments, may be provided with recognition sensors S that determine whether electronic devices to be charged 1230 and 1240 exist in the first and second cavities 1210 and 1260, respectively. The recognition sensors S may be disposed to be connected to the first and second cavities 1210 and 1260, respectively. In addition, the recognition sensors S may include a circuit architecture that distributes power depending on the sensing of the recognition sensors S. The circuit architecture, which distributes the power, may include a tunable power amplifier PA, a power distribution line L1, a non-distribution line L2, and first to third switches S1, S2, and S3. The first switch S1 may be disposed between the power PA and the power distribution line L1 and the non-distribution line L2 in order to selectively connect the power PA to the power distribution line L1 or the non-distribution line L2. The second switch S2 may be connected to the first charger 1200 in order to selectively connect the first charger 1200 to the power distribution line L1 or the non-distribution line L2. The third switch S3 may be connected to the second charger 1250 in order to selectively connect the second charger 1250 to the power distribution line L1 or the non-distribution line L2.

The wireless charging system configured as described above operates as follows: an electronic device to be charged exists in only one charger, electronic devices to be charged exist in both of two chargers, respectively, or no electronic device exists in the two chargers.

When an electronic device to be charged exists in only one of the first and second chargers 1200 and 1250 that are provided in the wireless charging system, the power, which has passed the power amplifier PA, is transferred to the non-distribution line L2, and the charger, which includes an electronic device, may be connected to the non-distribution line L2. The charger, which has no electronic device, may be connected to the power distribution line L1. The connection operation may be performed by the switching operations of the switches.

When electronic devices to be charged exist in both the first and second chargers 1200 and 1250 that are provided in the wireless charging system, the power, which has passed the power amplifier PA, may be connected to the power distribution line L1, and both the first and second chargers 1200 and 1250 may be connected to the power distribution lines L1.

When no electronic device to be charged exists in both the first and second chargers 1200 and 1250 that are provided in the wireless charging system, the power amplifier PA may be turned off.

Various embodiments of the present disclosure enable an electronic device to be conveniently charged in a wireless manner merely through a mounting operation.

Various embodiments of the present disclosure enable a plurality of electronic devices to be conveniently and separately charged in a wireless manner merely through a mounting operation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A charging device comprising:
   a cavity configured to form a resonance mode, wherein the cavity is shielded by a conductive material;
   a power feeding radiator configured to feed power within the cavity;
   a slot formed at a location with a maximum electric (E)-field by the power feeding radiator to form a power transmission route through E-field coupling; and
   a connection part configured to guide an electronic device to the charging device so that the power is transmitted from the charging device to a power receiver of the electronic device through the slot with magnetic (H)-field coupling.

2. The charging device of claim 1, wherein the electronic device comprises an external metal frame on at least a portion thereof.

3. The charging device of claim 2, wherein the power receiver is disposed on at least a portion of the external metal frame.

4. The charging device of claim 1, wherein the power is fed to a position where E-fields are concentrated within the cavity by using a power feeding radiator.

5. The charging device claim 4, wherein maximum power is formed in the slot by using the power feeding radiator.

6. The charging device of claim 2, wherein the power receiver includes:
   a dielectric board disposed on the external metal frame; and
   a transmission line formed on the dielectric board.

7. The charging device of claim 6, wherein, when the electronic device is mounted on the charging device, the slot and the power receiver are disposed to face each other and to overlap with each other.

8. The charging device of claim 6, wherein one end of the transmission line is connected to a charging circuit, and a length between another end and the slot is determined to be impedance-matched with the charging circuit.

9. The charging device of claim 2, wherein, when the electronic device is mounted on the charging device, the external metal frame of the electronic device is disposed to be in contact with the conductive material, thereby grounding the external metal frame.

10. The charging device of claim 2, further comprising:
    a waveguide disposed on a wall face of the cavity to form the resonance mode within the cavity.

11. The charging device of claim 10, wherein an aperture is provided in a side wall of the cavity, to which the waveguide is connected.

12. The charging device of claim 2, wherein the external metal frame is configured to form a portion of an external appearance of the electronic device.

13. A charging device, comprising:
    a cavity configured to form a resonance mode, wherein the cavity is shielded by a conductive material;
    a radiator disposed in the cavity;
    a slot configured to feed power;
    an aperture configured to receive the power, wherein the slot and the aperture are respectively formed at two locations with a maximum electric (E)-field on a side wall of the conductive material and are magnetic (H)-field coupled by feeding power from the radiator to form a power transmission route; and
    a connection part configured to guide an electronic device to the charging device so that the power is transmitted from the charging device to a power receiver of the electronic device through the slot with field coupling.

14. The charging device of claim 13, wherein the radiator includes a loop antenna or a patch antenna.

15. A charging device comprising:
    a cavity configured to form a resonance mode, wherein the cavity is shielded by a conductive material;
    a power feeding radiator configured to feed power to the inside of the cavity;
    a slot formed at a location that with a maximum electric (E)-field in the cavity by the power feeding radiator to form a power transmission route through E-field coupling; and
    a connection part configured to guide an electronic device to the charging device so that the power is transmitted from the charging device to a power receiver of the electric device through the slot with the E-field coupling.

16. The charging device of claim 15, wherein the power receiver is opened at one side thereof.

17. The charging device of claim 16, wherein a charging circuit is connected to the opened one side.

18. The charging device of claim 15, wherein further comprising:
    a waveguide disposed on a metallic material to feed power to the cavity.

19. The charging device of claim 15, further comprising:
    an external metal frame configured is to form a portion of an external appearance of the electronic device, and
    wherein the power receiver comprises a waveguide portion disposed on at least a portion of the external metal frame.

20. The charging device of claim 19, wherein the waveguide portion is configured to receive power through the E-field coupling, and
    an aperture is formed in a portion where E-fields are concentrated.

* * * * *